July 21, 1931. M. EISELE Re. 18,131

PNEUMATIC FEEDING DEVICE FOR THRASHERS

Original Filed Nov. 12, 1928

Inventor:
Martin Eisele
By Brown, Jackson, Boettcher & Dienner
Attys.

Reissued July 21, 1931

Re. 18,131

UNITED STATES PATENT OFFICE

MARTIN EISELE, OF GRAYMONT, ILLINOIS

PNEUMATIC FEEDING DEVICE FOR THRASHERS

Original No. 1,749,475, dated March 4, 1930, Serial No. 318,836, filed November 12, 1928. Application for reissue filed September 30, 1930. Serial No. 485,539.

This invention relates to an improvement in thrashing machines, including combines and other grain separating machines, and aims to provide means for pneumatically feeding the grain to the machine, thereby eliminating the usual endless belt carriers which are constantly breaking.

Pneumatic feeds are old per se, having been long used in thrashing machines to convey straw and grain from the cylinder to the separating and cleaning screens and also to convey straw from the screens to the stacker. However, insofar as I am aware, it is new to provide a pneumatic feed for the sole purpose of feeding the grain that is to be thrashed into the thrashing cylinder of the machine. The provision of a feed of this kind for the cylinder of a thrashing machine results in many advantages in addition to the inherent advantage obtained through the simplicity of the apparatus.

In thrashing machines of the kind commonly used heretofore wherein an endless belt is employed to convey the grain to the cylinder, and particularly in combines employing this type of feed, considerable difficulty has been experienced due to clogging of the machine. Since the feed belt is an endless one, it is necessary that a clearance space be provided between the useful end of the belt and the thrashing cylinder so that the belt itself and the cleats which it carries may pass over the pulley wheels and to the under side of the feeder floor between it and the sub floor. Grain is drawn through this opening and when sufficient quantities of this grain have been so disposed in the narrow space between the feeder floor and sub floor, the belt is either clogged or sufficiently nearly clogged to break the cleats by which the grain is moved on it.

Furthermore, in a combine, because of the extreme dryness of the grain during the operation of the machine a belt of this kind permits the loss of a very appreciable amount of grain through this opening between the end of the belt and the cylinder of the machine. That grain falls off of the belt onto the sub floor where it rests and since the space in which it rests is small, soon clogs the machine. If the grain contains an appreciable quantity of weeds which are green, the likelihood of clogging of the feeder belt is greatly increased since the belt rolls the weeds even more than it does the grain. Furthermore, the feeding devices used heretofore, when conveying a mixture of grain and weeds, have a tendency to roll the mixture into a quite compact mass which is fed into the cylinder and must be broken up thereby if the grain is to be separated therefrom. This results not only in a further loss of grain but also requires additional power in the cylinder and if that power is not immediately forthcoming when needed the cylinder itself becomes clogged and shut-down results.

By providing a pneumatic feed to the cylinder in lieu of these prior art feeders, in accordance with the teachings of my invention, I have achieved new and distinct advantages. First, the receiving chamber is equipped with a continuous floor which extends completely up to the cylinder itself so that there is no possibility of grain being lost from the junction of the floor and cylinder, nor is there any possibility of grain and weeds being clogged at the junction point of the feeding device and the cylinder.

Furthermore, with the pneumatic feed of my invention, the tendency of the old feeding devices to roll the grain into a compact mass is replaced by a tendency to separate and loosen the grain. The grain is conveyed from the sickle bar to the receiving compartment and dropped therein in the same manner as in the devices of the prior art. The pneumatic feed engages the grain as it is falling in the receiving compartment and carries it into the cylinder. This pneumatic conveyance of the grain tends to loosen it rather than to mat and wad it into compact bunches, as do the prior art feeders, with the result that a free, uniform feed of grain to the thrashing cylinder is achieved and better cleaning of the grain results.

I have observed that in a combine equipped with the feed of my invention green weeds picked up by the sickle bar and conveyed to the thrasher pass through it in a very much less mutilated condition than do similar weeds in a combine equipped with the customary belt feed. The pneumatic feed, therefore, lightens the load upon the entire thrashing machine since the weeds are retained approximately in their natural state and are not mixed with the grain and straw to the extent that they have been in machines of this kind employed heretofore, and as a result the grain can be binned immediately without danger of heating caused by green weed seeds.

In the use of a combine the amount of straw handled by the machine is regulated in accordance with the desires of the operator and the condition of the grain. For example, when oats or soy beans are being thrashed and it is desired to preserve a quantity of the straw, the sickle bar may be set low to cut practically all of the straw standing in the field. The volume of straw and grain to be handled by the combine is thereby increased and as a result the speed at which the straw is fed into the cylinder must be altered to correspond. Combines have in the past been provided with an elaborate system of change of speed gears to permit this adjustment, all of which have been eliminated by the pneumatic feed of my invention which can be regulated by the simple and customary apparatus employed to control the blast of a blower. When the grain is standing well and it is not desired to preserve the straw, the sickle bar may be elevated so that very little straw is fed into the machine and by suitable adjustment of the quantity of air delivered by the feeding blower the combine can be adjusted to efficiently handle the grain it receives under these conditions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
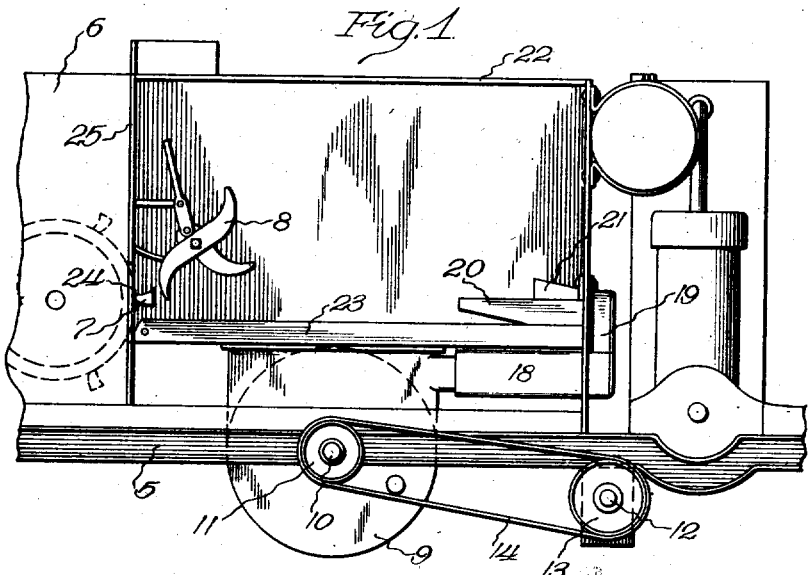
Figure 1 is an elevational view showing my pneumatic feed applied to a thrashing machine or combine.
Figure 2:
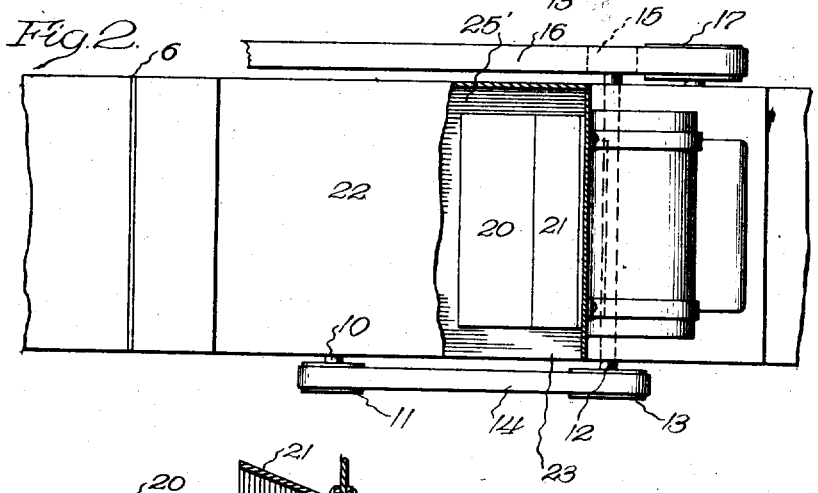
Figure 2 is a plan view of Figure 1, partly broken away.
Figure 3:
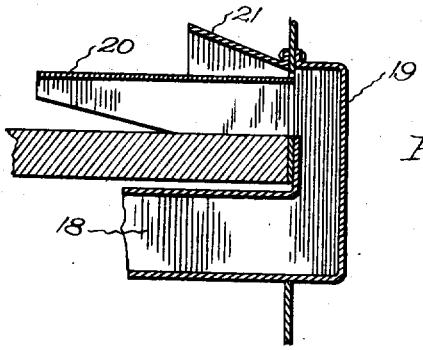
Figure 3 is an enlarged fragmentary sectional view of the pneumatic feed showing the construction of the cowl or deflector.

Referring now to the drawings in more detail, the frame 5 of the machine supports the body 6 of the thrasher, which contains the usual thrashing devices and also includes the grain receiving compartment 22 located near one end of the frame 5 and above it. This compartment 22 is completely closed on the top, bottom and all sides except for openings as will presently appear.

Grain is put into this compartment from the front side of it as viewed in Figure 1, and the side wall 23 of this side is cut short to provide an opening through which the grain enters. As is well understood by those skilled in the art, grain from the sickle bar of a combine is elevated by an endless conveyor and dumped into the receiving compartment 22, the sickle bar and conveyor employed in conjunction with my invention are of any preferred construction and have been omitted from the drawings as unnecessary.

A second opening 24 is provided adjacent the lower side of the end wall 25 of the compartment 22, this opening leading directly into the cylinder chamber in which the cylinder 7 is located. The compartment is also provided with a floor 25 which extends to and forms an edge of the opening 24 so that grain deposited on it must enter the cylinder 7.

Within the chamber 22 and above the opening 24 are the rotating blades 8 which are revolved in a clockwise direction as seen in Figure 1, to assist in causing the grain to enter the cylinder through the opening 24. The blades 8 may be made sharp to cut bunches of grain that may attempt to enter the cylinder; however, I have found that it is advantageous to make these blades rather dull. These blades are rotated at a uniform rate of speed and their tip ends descend on the grain as it is entering the cylinder, pushing it downward toward the floor of the receiving chamber. When the amount of straw and grain handled is great this action amounts to a beating of the grain, thereby supplementing the work of the cylinder so that the machine is better enabled to thoroughly clean the grain from the straw. Grain loosened from the straw by these blades 8 is not lost since the floor of the receiving chamber 22 is made continuous and extends to the cylinder itself and therefore grain cannot fall through it.

The operation of my pneumatic feed is not dependent upon the operation of these blades, and if it is desired to do so they may be omitted. The beating action of the blades on the grain is obviously lost by such an arrangement which in most instances is therefore less desirable.

The device forming the essence of the invention embodies a blower housing 9 in which a blower operates, the blower being mounted on the shaft 10, on which the pulley 11 is secured which pulley 11 receives motion from the shaft 12 through the pulley 13 and belt 14.

This shaft 12 has a pulley 15 mounted on the opposite end thereof which pulley is engaged by the belt 16 that operates over the power pulley 17. Communicating with the blower housing 9 is a laterally extended pipe 18 that has an upwardly extended end portion 19 terminating in a rearwardly extended deflector or cowl 20 that has an inclined forward edge so that material may pass under the cowl.

An auxiliary deflector 21 is positioned on the deflector 20, there being provided an opening in the deflector 20, directly under the deflector 21, so that air will be blown over the top of the deflector 20 to prevent the collection of grain on the upper surface thereof.

From the foregoing it will be seen that grain dumped into the feeder chamber 22 by the conveyor from the sickle bar, not shown, is pneumatically swept along the smooth bottom floor of the chamber and through the opening 24 into the cylinder. Any tendency of the grain and straw associated with it to rise in the cylinder is combated by the stream of downwardly descending straw from the conveyor and also by the rotating blades 8. The grain and straw are made to change their direction of travel in the receiving chamber, the change being occasioned by pneumatic means which tends to loosen any bunches which may be included. The longitudinal movement through the chamber is accomplished pneumatically and the characteristic tendency of the prior art feeders toward bunching is thereby replaced by a tendency to loosen. As a result of this arrangement, grain is fed more uniformly into the cylinder than has been heretofore possible in the devices of the prior art and because of this uniform feeding of the grain the concaves, not shown, which cooperate with the cylinder 7 to loosen the grain from the straw, may be equipped with a fewer number of teeth than has been heretofore possible and in certain instances the teeth of the concaves may be omitted entirely. As a result of this the total amount of power required to drive the thrashing unit is materially reduced and notwithstanding this the unit is capable of completely cleaning the grain and of being operated over long periods of time without it being necessary to shut it down and unclog the feeder.

In combines the amount of straw cut varies with the condition of the grain and obviously a different rate of feeding is required for each condition of cutting so that the thrasher may at all times be maintained full of straw and grain and yet at no time be overloaded or clogged thereby. My pneumatic feed lends itself readily to adjustments of this kind since by simple adjustment of the quantity of air used, such adjustment being made by any of the usual and well known air controlling arrangements, preferably actuated by levers within reach of the operator, the feed to the thrashing cylinder can be accurately set to meet the requirements of the particular straw being handled.

It will also be seen that owing to the construction the material may be fed into the machine with a minimum amount of power, it requiring only sufficient power to rotate the blower, where ordinarily endless conveyors are operated through chains of gearing.

I claim:

1. A thrashing machine including a receiver compartment, a blower casing mounted under the receiver compartment, a main pipe extending along the bottom of the receiver compartment and extending upwardly at one end of the receiver compartment and communicating with the interior of the receiver compartment, a deflector pipe communicating with the first mentioned pipe and extending an appreciable distance within the receiver compartment, and a blower in the blower casing for directing a blast of air through the main pipe and deflector pipe to blow bundles of grain into the machine.

2. A thrashing machine including a receiver compartment, a blower casing under the receiver compartment, a main pipe extending under the receiver compartment and connected with the blower casing to communicate with the receiver compartment, a deflector pipe disposed within the blower casing and communicating with the main pipe, and an auxiliary deflector mounted on the upper surface of the deflector pipe for directing a blast of air to the upper surface of the deflector pipe, and a blower in the blower casing.

3. The combination with a thrashing cylinder of a receiving chamber having a continuous floor extending into said cylinder, and pneumatic means for carrying grain deposited in said chamber across said floor into said cylinder, said means including means for producing two distinct strata of air across said chamber above said floor.

4. In combination with a thrashing cylinder, a substantially horizontal flat floor leading to said cylinder, means for forcing a main current of air along said floor toward said cylinder and means for diverting part of said air into a path above said main current.

5. The combination with a thrashing cylinder, of a receiving chamber having a continuous floor extending to said cylinder, a blower, a duct connected thereto to conduct a stream or air therefrom, and cowls terminating said duct and adapted to direct said stream of air in two district strata across said chamber near said floor.

6. The combination with a thrashing cylinder, of a receiving chamber having a continuous floor extending to said cylinder, a blower, a duct connected thereto to conduct a stream of air therefrom, a main cowl on said duct for directing the main portion of said air stream across said floor in a path disposed substantially parallel to it, and an auxiliary cowl for directing the remainder of said air stream in a diverging path above said main stream.

7. The combination with a thrashing cylinder, of a receiving chamber for receiving grain that is to be thrashed by the cylinder, and a pneumatic conveyor, including a blower and means for forming a plurality of currents of air across said chamber, for conveying said grain into said cylinder.

8. The combination with a thrashing cylinder, of a receiving chamber for receiving grain that is to be thrashed by the cylinder, and a pneumatic conveyor, including a blower and means for forming two unequal and divergent streams of air across said chamber for conveying said grain into said cylinder.

9. A thrashing machine including a receiver compartment, a blower casing, a main pipe connected with the blower casing to communicate with the receiver compartment, a deflector pipe communicating with said main pipe and extending an appreciable distance within the received compartment, a blower in said casing for producing a stream of air in said pipes to blow grain deposited in said compartment into said machine, and means for preventing an accumulation of grain on the top of said deflector pipe.

10. In a thrashing machine, a feeding chamber into which the grain to be thrashed is dropped, a floor in said chamber toward which said grain falls, pneumatic means for moving said grain in a path disposed longitudinally of said chamber and at right angles to its movement while falling, said means and movements cooperating in loosening bunches of said grain.

11. In a thrashing machine, a feeding chamber into which grain to be thrashed is fed by dropping, a floor in said chamber toward which said grain falls, means for forcing a current of air across said floor, said air engaging said falling grain and moving it longitudinally of said chamber, and means for deflecting a part of said air into a path above said current to align and keep said grain moving in said current.

12. In a thrashing machine, a feeding chamber into which grain to be thrashed is dropped, a floor in said chamber toward which said grain falls, means for forcing two currents of air across said chamber above said floor, said air currents engaging said falling grain consecutively and moving it across said chamber into a cylinder disposed adjacent said chamber.

13. In a thrashing machine, the combination with a thrashing cylinder, of an air duct having an opening facing said cylinder, a continuous floor extending from the edge of said cylinder to the edge of said duct, a blower for forcing a current of air through said duct, cowls over said duct opening for directing said air current in two streams across said floor to thereby feed grain that is falling towards said floor into said cylinder, and moving means adjacent said cylinder and cooperating with said blower to feed said grain to the cylinder.

14. The combination with a thrashing cylinder, of a receiving chamber for receiving grain that is to be thrashed by the cylinder, and a pneumatic conveyor including a blower and means for directing a plurality of unequal currents of air across said chamber toward said cylinder, for conveying said grain into said cylinder.

In witness whereof, I hereunto subscribe my name this 20th day of September, A. D. 1930.

MARTIN EISELE.